US012790958B2

(12) United States Patent
Schneider, III et al.

(10) Patent No.: US 12,790,958 B2
(45) Date of Patent: Nov. 10, 2026

(54) CERAMIC MATRIX COMPOSITE COMPONENT COVER PLATE WITH HEAT TRANSFER AUGMENTATION FEATURES AND METHOD

(71) Applicant: RTX CORPORATION, Farmington, CT (US)

(72) Inventors: Alex J. Schneider, III, Manchester, CT (US); Winston Smiddy, South Windsor, CT (US); Peter Wilkins, Manchester, CT (US); Jack R. Medzorian, West Hartford, CT (US); Howard J. Liles, Newington, CT (US)

( * ) Notice: Subject to any disclaimer, the term of this patent is extended or adjusted under 35 U.S.C. 154(b) by 0 days.

(21) Appl. No.: 18/975,167

(22) Filed: Dec. 10, 2024

(65) Prior Publication Data

US 2026/0160183 A1 Jun. 11, 2026

(51) Int. Cl.
*F01D 25/12* (2006.01)
*F01D 25/00* (2006.01)

(52) U.S. Cl.
CPC ........... *F01D 25/005* (2013.01); *F01D 25/12* (2013.01); *F05D 2260/20* (2013.01); *F05D 2300/6033* (2013.01)

(58) Field of Classification Search
None
See application file for complete search history.

(56) References Cited

U.S. PATENT DOCUMENTS

| | | | | |
|---|---|---|---|---|
| 6,659,714 | B1 | 12/2003 | Tiemann | |
| 10,364,706 | B2 * | 7/2019 | McCaffrey | F04D 29/164 |
| 10,914,192 | B2 | 2/2021 | Romanov | |
| 12,018,591 | B2 | 6/2024 | Harrington et al. | |
| 12,359,620 | B2 * | 7/2025 | Maldonado | F01D 5/187 |
| 2017/0058679 | A1 | 3/2017 | Spangler | |
| 2017/0292407 | A1 * | 10/2017 | Moga | F01D 25/24 |

OTHER PUBLICATIONS

European Search Report dated Jun. 2, 2026 issued in corresponding application 25222159.3.

* cited by examiner

*Primary Examiner* — Courtney D Heinle
*Assistant Examiner* — Danielle M. Christensen
(74) *Attorney, Agent, or Firm* — Christopher B. Kilner; MILLEN, WHITE, ZELANO & BRANIGAN, P.C.

(57) ABSTRACT

A cover plate for enclosing a cooling cavity of a ceramic matrix composite (CMC) component of a turbine engine may include a base plate dimensioned to cover an open cooling cavity of the CMC component. The base plate has a first side facing the cooling cavity and at least one feature plate is attached to the first side of the base plate. At least one heat transfer augmentation feature is formed on the at least one feature plate and extends into the cooling cavity, wherein the at least one heat transfer augmentation feature is configured to cause turbulence in a cooling air flow within the cooling cavity. Thus, rather than forming complex heat transfer augmentation features on the cooling cavity of the CMC component itself, such features can be easily provided using metal plate or sheet material or separately-formed CMC elements on the cover plate.

16 Claims, 5 Drawing Sheets

600

610 Form a Base CMC Plate Dimensioned to Cover the Open Cooling Cavity of the CMC Component

↓

620 Form at least One Heat Transfer Augmentation Feature on at least One Metal Plate to Cause Turbulence

↓

630 Attach the at least One Metal Plate to the Base CMC Plate with the at least One Heat Transfer Augmentation Feature Configured to Extend into the Cooling Cavity

CERAMIC MATRIX COMPOSITE COMPONENT COVER PLATE WITH HEAT TRANSFER AUGMENTATION FEATURES AND METHOD

FIELD OF THE INVENTION

The subject matter disclosed herein relates to augmenting cooling of ceramic matrix composite (CMC) components and, in particular, to a cover plate for a CMC component with an internal cooling cavity.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such components be made of heat resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC components by subjecting the components to a flow of cooling fluid (e.g., air).

To provide cooling of CMC components, secondary air flows, i.e., secondary to the main flow of high-energy, high temperature gas, can be used to cool components of the gas turbine engines that are exposed to high temperatures as well as to prevent high temperature gas from reaching those components that are not directly exposed to the hot gas flow. To facilitate the cooling of the CMC components, cavities can be provided within the components themselves to allow secondary cooling air to flow one region of the turbine. For example, a component such as a blade outer air seal (BOAS) can be provided with an internal cooling cavity to allow cooling air to flow a region between the engine casing and the outer radial surface of the BOAS into the internal cooling cavity of the BOAS to cool the interior of the component and thereby reduce its thermal deterioration due to exposure to the hot gas path.

Internal features which augment heat transfer can minimize the amount of cooling flow required and subsequently the engine performance needed to meet the target temperatures and component live. In many instances these heat transfer augmentation features are incorporated into the internal cavity definition of the component, and may include turbulators, trip strips, pedestal arrays and similar features. These features function by either increasing the wetted surface area of the internal, cooled wall or by generating flow features (often vortices) with higher turbulence. However, in certain cases, simplicity in the internal geometry is required for manufacturability reasons and these features must be removed.

The above information disclosed in this Background section is only for understanding of the background of the inventive concepts and, therefore, it may contain information that does not constitute prior art.

SUMMARY OF THE INVENTION

The present disclosure is directed, in a first aspect, to a cover plate for enclosing a cooling cavity of a ceramic matrix composite (CMC) component of a turbine engine. The cover plate includes a base plate dimensioned to cover an open cooling cavity of the CMC component, the base CMC plate having a first side facing the cooling cavity. The cover plate further includes at least one feature plate attached to the first side of the base plate, and at least one heat transfer augmentation feature formed on the at least one feature plate and extending into the cooling cavity, wherein the at least one heat transfer augmentation feature is configured to cause turbulence in a cooling air flow within the cooling cavity.

In an embodiment of the cover plate, the at least one feature plate may be a single sheet dimensioned substantially identical to the first side of the base plate and the single sheet may include a plurality of rows of heat transfer augmentation features.

In another embodiment of the cover plate, each row of heat transfer augmentation features may have a plurality of evenly-spaced heat transfer augmentation features.

In a further embodiment of the cover plate, alternate rows of the evenly-spaced heat transfer augmentation features may be staggered.

In yet another embodiment of the cover plate, the at least one heat transfer augmentation feature may include a plurality of heat transfer augmentation features that are irregularly-spaced to increase heat transfer in certain areas.

In an embodiment of the cover plate, the at least one feature plate may include a plurality of sub-plates, wherein each sub-plate may include a plurality of evenly-spaced heat transfer augmentation features.

In another embodiment of the cover plate, the plurality of sub-plates may be disposed parallel to each other on the first side of the base plate, and may be alternately offset so as to stagger the evenly-spaced heat transfer augmentation features.

In a further embodiment of the cover plate, the at least one feature plate may be made of metal alloy and the at least one heat transfer augmentation feature may be formed by cutting and bending the at least one feature plate to form a fin having a predetermined geometry.

In yet another embodiment of the cover plate, the at least one feature plate may be made of metal alloy and the at least one heat transfer augmentation feature may be formed on the at least one feature plate by punching, welding, 3-D printing, extruding, or casting.

The present disclosure is also directed, in a second aspect, to a ceramic matrix composite (CMC) component of a turbine engine. The CMC component includes: an open cooling cavity formed adjacent a wall of the CMC component to be cooled; a base plate dimensioned to cover the open cooling cavity of the CMC component, the base plate having a first side facing the cooling cavity; at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity.

In an embodiment of the CMC component, the base plate and the at least one feature plate may be made of metal alloy, wherein the at least one feature plate may be a single sheet dimensioned substantially identical to the first side of the base plate, and wherein the at least one heat transfer augmentation feature formed on the single sheet may include a plurality of rows of heat transfer augmentation features.

In another embodiment of the CMC component, each row of heat transfer augmentation features may have a plurality of evenly-spaced heat transfer augmentation features, and alternate rows of the evenly-spaced heat transfer augmentation features may be staggered.

In a further embodiment of the CMC component, the at least one feature plate may include a plurality of sub-plates, and each sub-plate may include a plurality of evenly-spaced heat transfer augmentation features.

In yet another embodiment of the CMC component, the sub-plates may be disposed parallel to each other on the first side of the base plate, and may be alternately offset so as to stagger the evenly-spaced heat transfer augmentation features.

In an embodiment of the CMC component, the base plate and the at least one feature plate may be made of metal alloy, and the at least one heat transfer augmentation feature may be formed on the at least one feature plate by punching, welding, 3-D printing, extruding, or casting.

The present disclosure is further directed, in a third aspect, to a method for forming a cover plate for an open cooling cavity of a ceramic matrix composite (CMC) component of a turbine engine. The method includes: forming a base plate dimensioned to cover the open cooling cavity of the CMC component, the base plate having a first side facing the cooling cavity; forming at least one heat transfer augmentation feature on at least one feature plate, wherein the at least one heat transfer augmentation feature is configured to cause turbulence in a cooling air flow within the cooling cavity; and attaching the at least one feature plate to the first side of the base plate with the at least one heat transfer augmentation feature configured to extend into the cooling cavity when the cover plate covers the cooling cavity.

In an embodiment of the method, forming the at least one heat transfer augmentation feature on the at least one feature plate may include forming a plurality of rows of evenly-spaced heat transfer augmentation features on a single feature plate dimensioned to substantially correspond to the first side of the base plate, wherein alternating rows of the heat transfer augmentation features may be staggered.

In another embodiment of the method, forming the at least one heat transfer augmentation feature on the at least one feature plate may include forming a row of evenly-spaced heat transfer augmentation features on a plurality of feature plates dimensioned to be disposed parallel to each other on the first side of the base plate, wherein the heat transfer augmentation features of alternating feature plates may be staggered.

In a further embodiment of the method, the base plate and the at least one feature plate may be made of metal alloy, and forming at least one heat transfer augmentation feature on the at least one feature plate may include an operation selected from the group consisting of punching, welding, 3-D printing, extruding, casting, and combinations thereof.

In yet another embodiment of the method, the base plate and the at least one feature plate may be made of metal alloy, and forming at least one heat transfer augmentation feature on the at least one feature plate may include cutting and bending the at least one feature plate to form a fin having a predetermined geometry.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
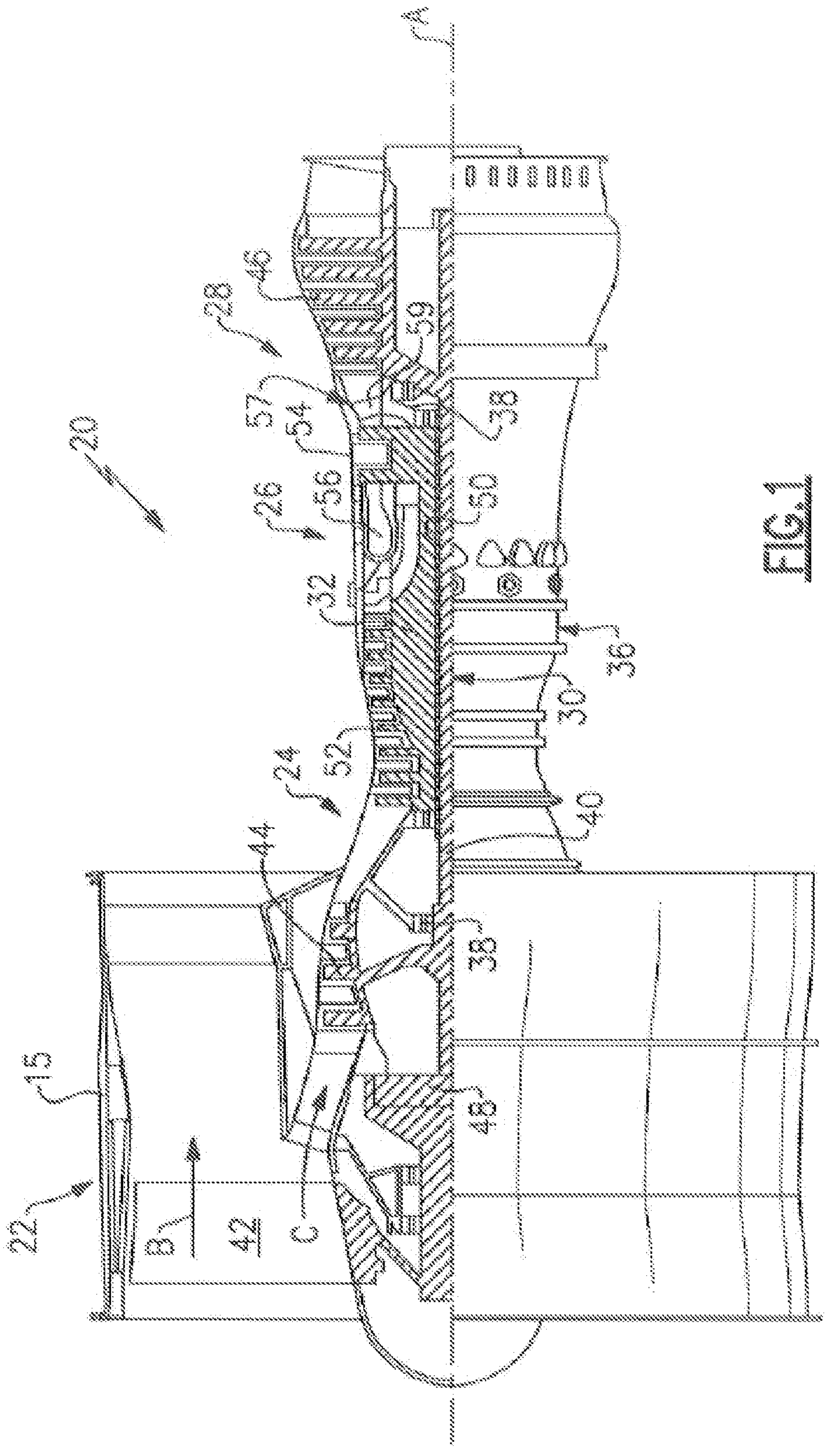
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to the incorporation of heat transfer augmentation features into the attached cover plate within a turbine component. The features included are configured to increase turbulence within the cavity and subsequently increase the heat transfer on the opposing wall to cool the CMC component. The features are easily formed on a metal plate and can consist of multiple shapes/sizes/geometries depending on the requirement of the cavity. Method of manufacture could include bending/forming sheet metal used in cover plates to become vortex generators. These can be incorporated as a single plate of many features, or as a plurality of pieces assembled to the desired configuration. More complex arrangements of augmentation features could be incorporated via casting or machining of the cover plate material.

While the discussion below often makes reference to BOAS and BOAS segments, it should be recognized that the present disclosure is not limited to BOAS but includes any CMC component for which a cooling cavity is desirable, for example, combustion liners and turbine blades and vanes.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2A:
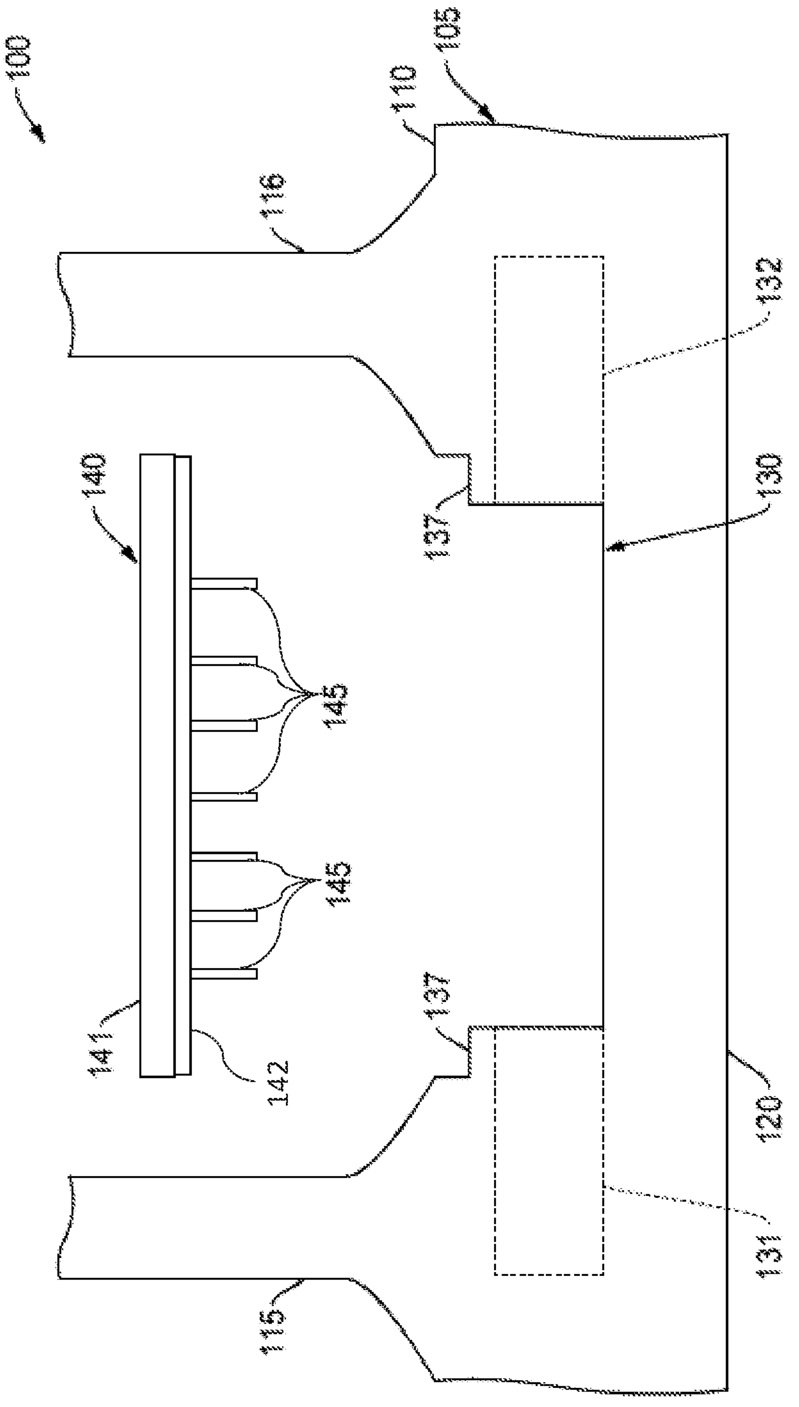
FIG. 2A is a schematic illustration of a cross section of a blade outer air seal (BOAS) having a cooling cavity and a cover plate for closing the cooling cavity.

FIG. 2A illustrates a cross section of a BOAS segment 100 with a cover plate 140 not yet installed. In this embodiment, the BOAS segment 100 includes a base 105 having a radial outer surface or top surface 110 that faces an outer casing of the engine and a radial inner surface or bottom surface 120 that faces the interior of the turbine section and is exposed to the flow of hot gases. The base 105 is a CMC formed from a plurality of stacked ceramic a plurality of unidimensional fabric layers or stacked tapes (e.g., made from SiC fibers) within a ceramic matrix (e.g., a SiC matrix), two-dimensional woven fiber plies in a ceramic matrix or from a three-dimensional weave of fibers or fiber tows within a ceramic matrix. The CMC can also be formed from other fiber/matrix combinations such as C/C, C/Si, and alumina/alumina.

As shown in FIG. 2A, the BOAS segment 100 further includes two flanges 115 and 116 that extend radially from the outer surface 110 of the segment 100. These flanges 115 and 116 are load bearing features and provide structures for attaching the segment 100 to the outer casing of the engine. In this embodiment flange 115 is the forward flange (i.e., closest to the front of the engine) and flange 116 is the aft flange (i.e., closest to the rear of the engine). Each flange 115 and 116 can be formed, for example, as a Y-weave of a plurality of ceramic fiber plies.

As shown in FIG. 2A, the base 105 of segment 100 is provided with an open cooling cavity 130. The cooling cavity 130 can be formed prior to densification of the CMC preform by precutting the fiber plies that are to be laid up to form the preform with a cavity or by cutting (machining) the cavity into the preform once the plies are laid up. Alternatively, the cooling cavity 130 can be created by machining after an initial pre-densification, such as by chemical vapor infiltration (CVI). The cooling cavity 130 can also be created after densification is complete by machining the densified preform.

As showed by dashed lines indicating regions 131 and 132, the cooling cavity 130 can extend beneath the flanges 115 and 116 to provide more cooling of the internal region of the component.

Figure 2B:
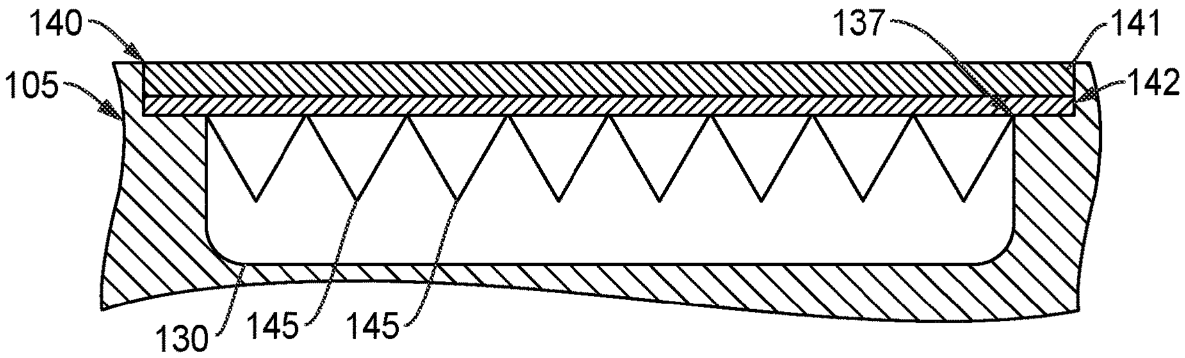
FIG. 2B is a schematic illustration of a cross section of a portion of a blade outer air seal (BOAS) having a cooling cavity with the cover plate closing the cooling cavity.
Figure 3A:
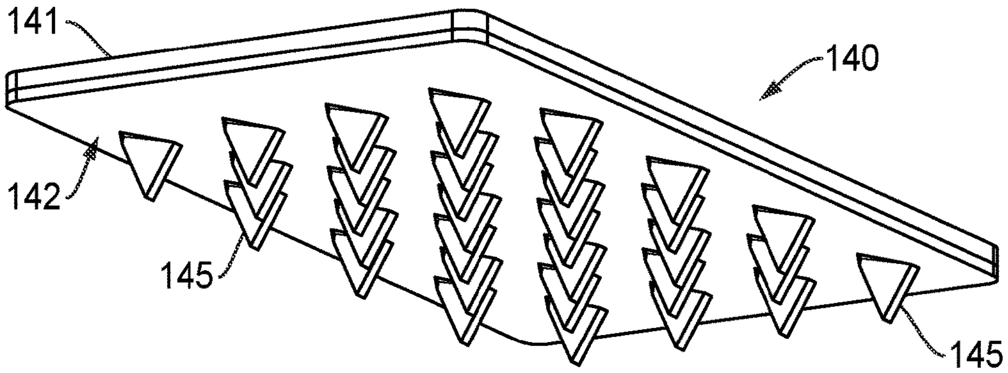
FIG. 3A is a perspective view of an embodiment of a cover plate in accordance with the present disclosure.
Figure 3B:
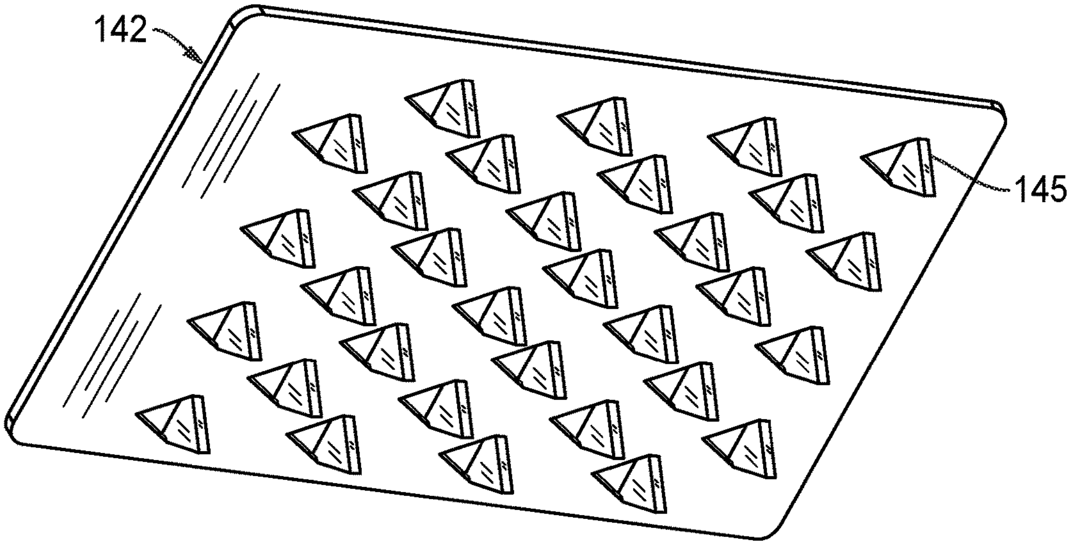
FIG. 3B is another perspective view of an embodiment of a metal plate with heat transfer augmentation features in accordance with the present disclosure.
Figure 3C:
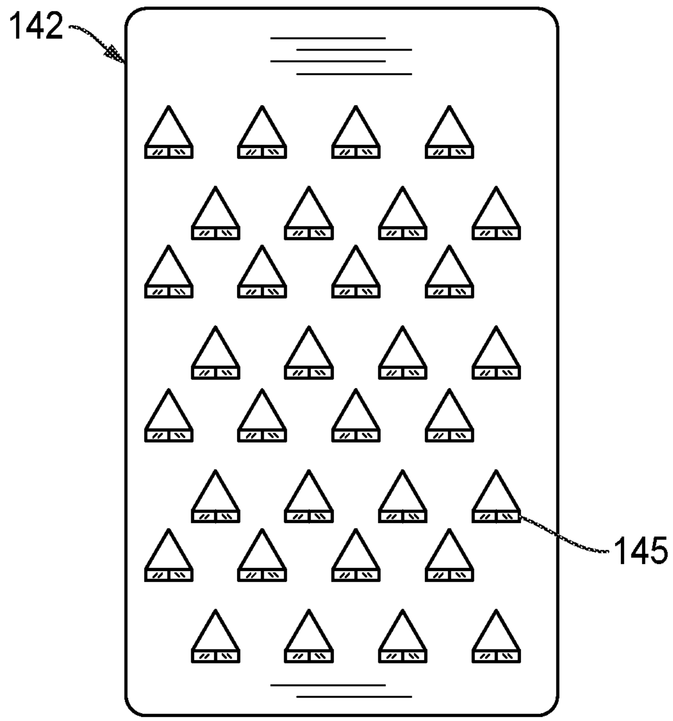
FIG. 3C is a plan view of the embodiment of the metal plate of FIG. 3B in accordance with the present disclosure.

Also shown in FIG. 2A is a cover plate 140, which will be positioned to close the open cooling cavity 130, as seen in FIG. 2B. The cover plate 140 includes a base plate 141, which may be made from a high-temperature capable metal alloy or may be made from CMC materials such as a one or more densified two-dimensional fiber plies, and at least one feature plate 142, which may also be made of metal alloy or CMC materials, into which a plurality of heat augmentation features 145 have been formed. When made of metal, feature plate(s) 142 may be made of a high-temperature resistant Ni or Co alloy, including but not limited to AMS 5879, AMS 5914, AMS 5950, AMS 5704-5709, AMS 5715, AMS 5754, AMS 5798, and the like.

Typically, when base plate 141 is made of metal alloy, feature plate(s) 142 will also be made of metal alloy so that feature plate(s) 142 may be welded or brazed to the base plate 141. Similarly, when base plate 141 is made from CMC materials, the feature plate(s) 142 will typically also be made of CMC materials to permit attachment to each other either pre- or post-densification. However, in some embodiments, the base plate 141 may be formed of CMC materials and the feature plate(s) 142 may be made of metal alloy, and clips, pins, or any other suitable means may be used to attach the feature plate(s) 142 to the base plate 141. When Ni alloys are used, a coating may be applied between the base plate 141 and/or the feature plate 142 to prevent interaction.

In one or more embodiments, feature plate 142 may be held in place on a shoulder 137 by the base plate 141, and in other embodiments may be attached to base plate 141 in any known suitable manner for the materials used, including but not limited to the attachments mentioned above.

Heat augmentation features 145 may include any type of turbulence generator (i.e., turbulator) such as trip strips, pedestal arrays, pin fins, and the like. In one or more embodiment, the heat augmentation features 145 may be fins that can include multiple shapes, sizes, and/or geometries. When the feature plate 142 is formed of metal alloy, the heat augmentation features 145 may be formed on feature plate 142 by bending, welding, punching, 3-D printing, casting, machining, and combinations thereof. When the feature plate(s) are formed of CMC materials, the augmentation features may be formed in the layup of the preform by cutting and stacking of plies, by machining of layup plies, and/or by insertion of noodles between layup plies, and/or may be formed in post-densification by machining. For example, such heat transfer augmentation features 145 can be made by machining after densification or pre-densification, or they can be formed during layup of the feature plate 142 and held in position by tooling of fugitive materials during densification or pre-densification.

The heat augmentation features 145 may be configured to increase the turbulence of a cooling air flow so as to increase heat transfer with respect to the CMC component 100. Although the heat augmentation features 145 are illustrated as uniform and substantially evenly-spaced in the present embodiment for ease of understanding, embodiments are not limited thereto, and the distribution and shapes of the heat augmentation features 145 may be varied in order to vary the location of turbulence and the resulting augmented heat transfer within the cooling cavity 130. Indeed, in certain embodiments, irregularly-spaced heat augmentation features 145 may be used to form specific cooling profiles and/or vortex alleys so as to increase heat transfer in certain areas.

As shown in FIG. 2A, in the area of the opening into cooling cavity 130, sidewall(s) of the cooling cavity 130 is provided with the shoulder 137 which is below the level of the top outer surface 110 of the CMC preform. When placed into position to close the opening of the cooling cavity 130, cover plate 140 can rest on shoulder 137. In this way, when placed into position, it is possible for the top surface of cover plate 140 to be flush with the outer surface 110 of the component.

In operation, cooling air from the region above outer surface 110 can flow into the cooling cavity 130 via one or more cooling inlet(s) (not shown) in, for example, the outer surface 110. The cooling air can then circulate through the cooling cavity 130 in a turbulent manner as a result of vortices/mixing caused by the heat augmentation features 145, and exit the cooling cavity 130 via one or more cooling outlet(s) (not shown) in, for example, the bottom surface 120, i.e., the surface exposed to the hot gas flow. Alternatively, cooling outlet(s) could be formed in the radially aligned side wall(s) of the BOAS segment to provide an intersegment purge or cooling flow between adjacent segments.

FIG. 2B illustrates cover plate 140 positioned on shoulders 137 in order to cover and enclose the cooling cavity 130. The cover plate 140 may be retained in this position in any suitable manner, such as fasteners, pins, clips, etc., or may be retained by other components (not shown). Heat transfer augmentation features 145 formed on feature plate 142 extend into the interior space of cooling cavity 130 to act as turbulators for the cooling air flow within the cooling cavity 130.

As shown in FIGS. 2B, 3A, 3B, and 3C, in an embodiment of the present disclosure, the heat augmentation features 145 may include staggered rows of triangular fins which may, for example, be formed by cutting V shapes into a metal alloy feature plate 142 and bending the V shapes to extend transversely from metal plate 142. In one or more embodiments, the cutting and bending operations may be combined into a single punching operation. However, the heat transfer augmentation features 145 incorporated into a metal alloy feature plate 142 are not limited to this embodiment, and in other embodiments may include triangular or other shaped fins that are welded, 3-D printed, extruded, or cast onto the metal sheet or plate of feature plate 142.

Figure 4:
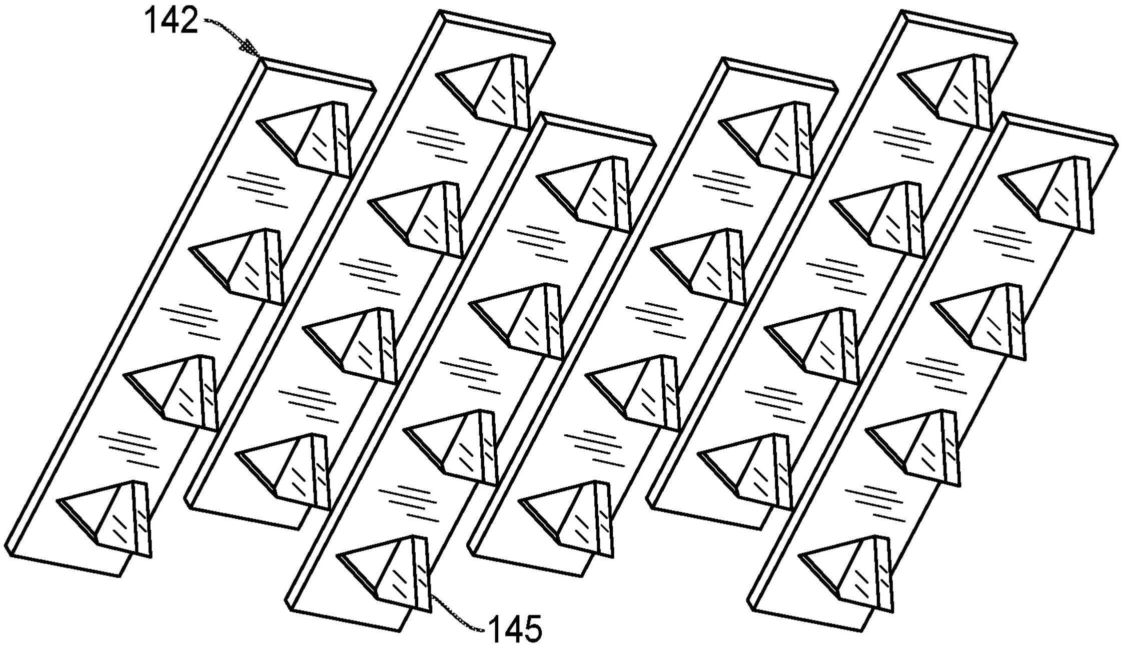
FIG. 4 is a perspective view of another embodiment using a plurality of metal plates with heat transfer augmentation features in accordance with the present disclosure.

With respect to FIG. 4, in one or more embodiments, the staggered rows of heat transfer augmentation features 145 attached to the base plate 141 of cover plate 140 may be provided by multiple feature plates 142. In one or more embodiments, the multiple feature plates 142 may be identical and staggered in their positioning, as illustrated in FIG. 4, wherein each row of heat transfer augmentation features 145 is provided on one feature plate 142. An advantage of this embodiment is that it requires less metal plate/sheet material or CMC materials, requires less tooling, and uses a single modular element that may be adapted to multiple spacing and cavity size arrangements.

Figures 5, 6:
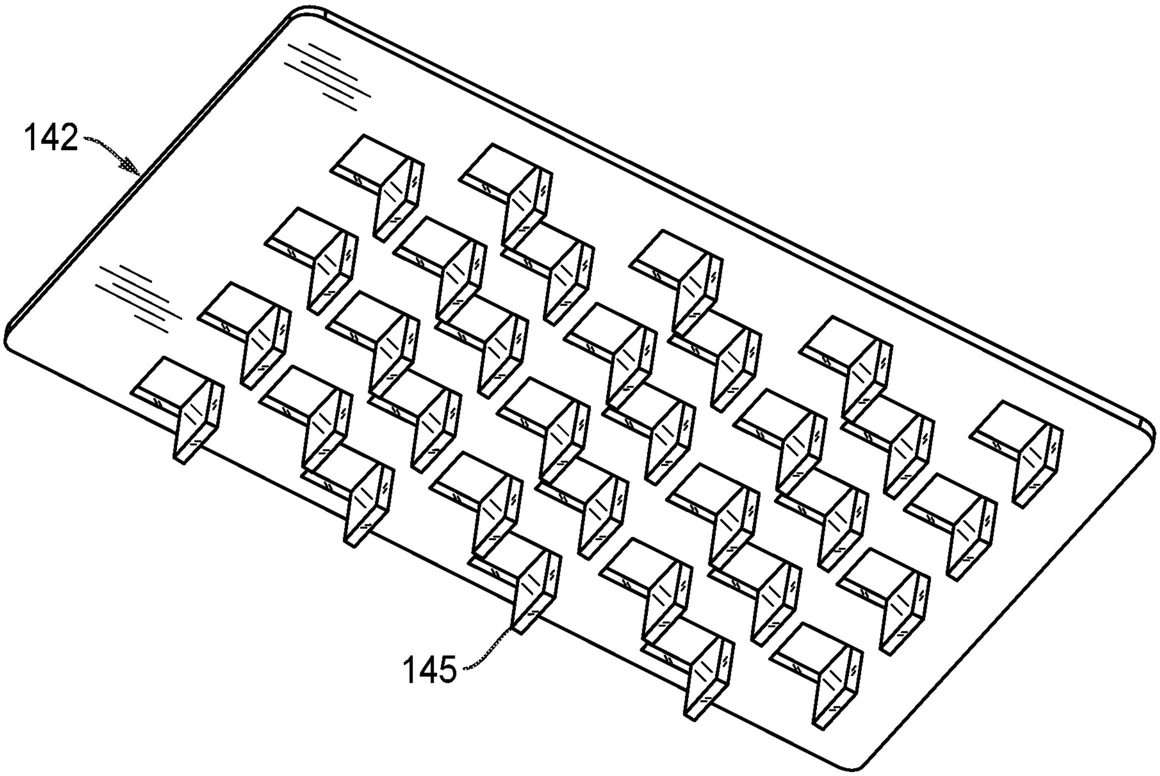
FIG. 5 is a perspective view of a further embodiment of a metal plate with heat transfer augmentation features in accordance with the present disclosure.
FIG. 6 is a flow diagram of an embodiment of a method for forming a cover plate for an open cooling cavity of a ceramic matrix composite (CMC) component of a turbine engine in accordance with the present disclosure.

FIG. 5 illustrates another embodiment of feature plate 142, in which the fins forming the heat transfer augmentation features 145 on a metal alloy plate 142 have a different geometry. Rather than the triangular fins of FIGS. 2B, 3A, 3B, and 3C, FIG. 5 illustrates square or rectangular fins punched into a metal alloy feature plate 142 to form the heat transfer augmentation features 145. However, the heat transfer augmentation features 145 incorporated into metal alloy embodiments of feature plate 142 are not limited to this embodiment, and in other embodiments may include square or rectangular shaped fins that are welded, 3-D printed, extruded, or cast onto the metal sheet or plate of feature plate 142.

An embodiment of a method 600 for forming a cover plate for an open cooling cavity of a CMC component of a turbine engine is illustrated in FIG. 6. The method 600 includes a step 610 of forming a base plate 141 dimensioned to cover the open cooling cavity 130 of the CMC component. The base plate 141 includes a first side facing the cooling cavity 130. In one or more embodiments, the base plate 141 may fit into a shoulder 137 of the CMC component.

Method 600 also includes a step 620 of forming at least one heat transfer augmentation feature 145 on at least one feature plate 142, wherein the at least one heat transfer augmentation feature 145 is configured to cause turbulence in a cooling air flow within the cooling cavity 130. The order of steps 610 and 620 may be reversed or may be performed in parallel.

In one or more embodiments, the step 620 of forming the at least one heat transfer augmentation feature 145 on the at least one feature plate 142 may include forming a plurality of rows of evenly-spaced heat transfer augmentation features 145 on a single feature plate 142 dimensioned to substantially correspond to the first side of the base plate 141, wherein alternating rows of the heat transfer augmentation features 145 may be staggered.

In one or more other embodiments, the step 620 of forming the at least one heat transfer augmentation feature 145 on the at least one feature plate 142 may include forming a row of evenly-spaced heat transfer augmentation features 145 on a plurality of feature plates 142 dimensioned to be disposed parallel to each other on the first side of the base plate 141, wherein the heat transfer augmentation features 145 of alternating feature plates 142 may be staggered.

In one or more further embodiments, the feature plate 142 may be formed of metal alloy and the step 620 of forming at least one heat transfer augmentation feature 145 on the at least one feature plate 142 may include an operation selected from the group consisting of punching, welding, 3-D printing, extruding, casting, and combinations thereof.

In other embodiments, the feature plate 142 may be formed of metal alloy and the step 620 of forming at least one heat transfer augmentation feature 145 on the at least one feature plate 142 may include cutting and bending the at least one metal alloy feature plate 142 to form a fin having a predetermined geometry.

Method 600 further includes a step 630 of attaching the at least one feature plate 142 to the first side of the base plate 141 with the at least one heat transfer augmentation feature 145 configured to extend into the cooling cavity 130 when the cover plate 140 covers the cooling cavity 130.

In accordance with the present disclosure, the design of cooling cavity portions of CMC components and their associated preforms may be simplified and use flat surfaces rather than complex cast or machined features to augment heat transfer since the heat transfer augmentation features are moved to the cover plate. The heat transfer augmentation features that would be extremely complicated to produce with CMC materials within the cavity can be simply and inexpensively formed using metal sheet or plate material or more simply with stand-alone CMC materials not disposed within a cavity.

Moving the heat transfer augmentation features to the cover plate also allows for providing changes to the internal heat transfer distribution within a cooling cavity after the CMC component has been produced. Further, when using metal alloy plates, by providing the heat transfer augmentation features on the metal plate, simple sheet metal material and forming/fabrication techniques may be used to keep manufacturing costs down.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A cover plate for enclosing a cooling cavity of a ceramic matrix composite (CMC) component of a turbine engine, comprising:

a base plate dimensioned to cover an open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the at least one feature plate is a single sheet dimensioned substantially identical to the first side of the base plate and the single sheet includes a plurality of rows of heat transfer augmentation features.

2. The cover plate of claim 1, wherein each row of heat transfer augmentation features has a plurality of evenly-spaced heat transfer augmentation features.

3. The cover plate of claim 2, wherein alternate rows of the evenly-spaced heat transfer augmentation features are staggered.

4. The cover plate of claim 1, wherein the at least one feature plate is made of metal alloy and the heat transfer augmentation features are fins.

5. A cover plate for enclosing a cooling cavity of a ceramic matrix composite (CMC) component of a turbine engine, comprising:

a base plate dimensioned to cover an open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the at least one heat transfer augmentation feature includes a plurality of heat transfer augmentation features that are irregularly-spaced to increase heat transfer in certain areas.

6. A cover plate for enclosing a cooling cavity of a ceramic matrix composite (CMC) component of a turbine engine, comprising:

a base plate dimensioned to cover an open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the at least one feature plate includes a plurality of sub-plates, wherein each sub-plate includes a plurality of evenly-spaced heat transfer augmentation features.

7. The cover plate of claim 6, wherein the plurality of sub-plates are disposed parallel to each other on the first side of the base plate, and are alternately offset so as to stagger the evenly-spaced heat transfer augmentation features.

8. A cover plate for enclosing a cooling cavity of a ceramic matrix composite (CMC) component of a turbine engine, comprising:

a base plate dimensioned to cover an open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the at least one feature plate is made of metal alloy and the at least one heat transfer augmentation feature is formed by cutting and bending the at least one feature plate to form a fin having a predetermined geometry.

9. A ceramic matrix composite (CMC) component of a turbine engine, comprising:

an open cooling cavity formed adjacent a wall of the CMC component to be cooled;

a base plate dimensioned to cover the open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the base plate and the at least one feature plate are made of metal alloy, wherein the at least one feature plate is a single sheet dimensioned substantially identical to the first side of the base plate, and wherein the at least one heat transfer augmentation feature formed on the single sheet includes a plurality of rows of heat transfer augmentation features.

10. The cover plate of claim 9, wherein each row of heat transfer augmentation features has a plurality of evenly-spaced heat transfer augmentation features, and wherein alternate rows of the evenly-spaced heat transfer augmentation features are staggered.

11. The CMC component of claim 9, wherein the heat transfer augmentation features are fins.

12. A ceramic matrix composite (CMC) component of a turbine engine, comprising:

an open cooling cavity formed adjacent a wall of the CMC component to be cooled;

a base plate dimensioned to cover the open cooling cavity of the CMC component, the base plate having a first side facing the cooling cavity;

at least one feature plate attached to the first side of the base plate; and at least one heat transfer augmentation feature formed on the at least one feature plate and extending into the cooling cavity, wherein the at least one heat transfer augmentation feature is configured to cause turbulence in a cooling air flow within the cooling cavity, wherein the at least one feature plate includes a plurality of sub-plates, and wherein each sub-plate includes a plurality of evenly-spaced heat transfer augmentation features.

13. The CMC component of claim 12, wherein the sub-plates are disposed parallel to each other on the first side of the base plate, and are alternately offset so as to stagger the evenly-spaced heat transfer augmentation features.

14. A method for forming a cover plate for an open cooling cavity of a ceramic matrix composite (CMC) component of a turbine engine, comprising:

forming a base plate dimensioned to cover the open cooling cavity of the CMC component, the base plate having a first side facing the cooling cavity;

forming at least one heat transfer augmentation feature on at least one feature plate, wherein the at least one heat transfer augmentation feature is configured to cause turbulence in a cooling air flow within the cooling cavity; and attaching the at least one feature plate to the first side of the base plate with the at least one heat transfer augmentation feature configured to extend into the cooling cavity when the cover plate covers the cooling cavity, wherein the base plate and the at least one feature plate are made of metal alloy, and forming at least one heat transfer augmentation feature on the at least one feature plate includes cutting and bending the at least one feature plate to form a fin having a predetermined geometry.

15. The method of claim 14, wherein forming the at least one heat transfer augmentation feature on the at least one feature plate includes forming a plurality of rows of evenly-spaced heat transfer augmentation features on a single feature plate dimensioned to substantially correspond to the first side of the base plate, wherein alternating rows of the heat transfer augmentation features are staggered.

16. The method of claim 14, wherein forming the at least one heat transfer augmentation feature on the at least one feature plate includes forming a row of evenly-spaced heat transfer augmentation features on a plurality of feature plates dimensioned to be disposed parallel to each other on the first side of the base plate, wherein the heat transfer augmentation features of alternating feature plates are staggered.

* * * * *